United States Patent [19]

Munakata

[11] Patent Number: 4,797,061
[45] Date of Patent: Jan. 10, 1989

[54] MULTI-JOINTED ROBOT

[75] Inventor: Tadashi Munakata, Tokyo, Japan

[73] Assignee: Kabushiki Kaisha Toshiba, Kawasaki, Japan

[21] Appl. No.: 13,136

[22] Filed: Feb. 10, 1987

[30] Foreign Application Priority Data

Mar. 3, 1986 [JP] Japan .................... 61-44131

[51] Int. Cl.⁴ ............................................. B25J 17/00
[52] U.S. Cl. ................................. 414/744.5; 901/15; 901/23; 901/28
[58] Field of Search ........... 414/744 R, 744 A, 744 B, 414/744 C; 901/15, 23, 24, 28; 74/67, 68; 310/81

[56] References Cited

U.S. PATENT DOCUMENTS

| 527,671 | 10/1984 | Devoll | 74/67 |
| 4,034,246 | 7/1977 | Nakashima | 310/81 |
| 4,610,598 | 9/1986 | Hamada et al. | 901/15 X |

FOREIGN PATENT DOCUMENTS

| 0078522 | 5/1983 | European Pat. Off. |
| 0118012 | 9/1984 | European Pat. Off. |
| 0180829 | 5/1986 | European Pat. Off. |
| 60-76992 | 5/1985 | Japan . |
| 2145055 | 3/1985 | United Kingdom . |

OTHER PUBLICATIONS

Mechanical Movements, H. Brown, 1893, pp. 58-59.

Primary Examiner—Robert J. Spar
Assistant Examiner—Donald W. Underwood
Attorney, Agent, or Firm—Foley & Lardner, Schwartz, Jeffery, Schwaab, Mack, Blumenthal & Evans

[57] ABSTRACT

A multi-jointed robot of high-speed and high-precision motion with reduced stress is disclosed. This robot has a first arm which is pivotal on a base, and a second arm which is pivotal on the first arm. The first arm is directly moved by a first motor on the base, while the second arm is moved by a double parallel link mechanism driven by a second motor which has two shafts at its both ends and which is supported on the base.

9 Claims, 4 Drawing Sheets

MULTI-JOINTED ROBOT

BACKGROUND OF THE INVENTION

1. Field of the Invention

This invention relates generally to robots, and more particularly to a robot with a multi-jointed arm.

2. Description of the Prior Art

Higher speed and greater precision in the motion of robots, such as multi-jointed robots utilized in assembly lines, are important, since they result in shorter "tact-time" and higher productivity. The term "tact-time" refers to the time during which a robot performs its assigned operation. Conventional speed reducers, such as harmonic drive gears, often are poor in rigidity, exhibit back-lash, and have narrow design limits with respect to input revolution rate and speed reduction ratio. Therefore, direct driving of arms using low-speed, high-torque motors without speed reducers has been developed. However, if a motor is arranged far from the pivotal center on an arm, an excess moment of inertia is added to the arm due to the mass of the motor. Therefore, it is preferable that the motor be arranged at the pivotal center of the arm.

Japanese Patent Disclosure (Kokai) 60-76992 discloses a directly driven multi-jointed robot. In the disclosure, a first arm pivots in response to a first motor. A second arm, which is attached to a shaft passing through an aperture in the first arm, is driven by a second motor with a double parallel link mechanism. The second motor is set at the pivotal center of the first arm. A single crank shaft, which is directly driven by the second motor, drives the double parallel link mechanism. However, since the crank shaft is driven at one side of the second motor, the crank shaft is highly stressed. Thus, the shaft must have a high strength and rigidity.

Furthermore, since the second motor is supported on the first arm, the mass and the inertia of the second motor are added to the first arm, and the reaction torque of the second motor is added to the first motor load. Therefore, the first motor requires large torque and large power.

SUMMARY OF THE INVENTION

The object of this invention is to reduce stress in the crank shaft of a motor of a multi-jointed robot.

Another object of the invention is to reduce the torque and power requirements of a motor for a multi-jointed robot.

Additional objects and advantages will be apparent from the accompanying specification and claims, or may be learned by practice of the invention.

According to one aspect of the invention, there is provided a multi-jointed robot, comprising: a first arm; first drive means connected to the first arm and having a central axis, for pivotally moving the first arm about the central axis; a second arm, pivotally connected to the first arm for relative motion therebetween; and second drive means for moving the second arm with respect to the first arm, including a motor and shaft means extending from opposite sides of the motor operatively connected to the second arm for reducing stress on the motor.

According to another aspect of the invention, there is provided a multi-jointed robot, compising: a first arm; first drive means connected to the first arm and having a central axis, for pivotally moving the first arm about the central axis; a second arm, pivotally connected to the first arm for relative motion therebetween; second drive means for moving the second arm with respect to the first arm, including a motor; a base, the first drive means being fixed to the base; and means for supporting the motor with the base for reducing the torque requirements of the first drive means.

BRIEF DESCRIPTION OF THE DRAWINGS

The invention will be described in further detail with reference to the accompanying drawings, wherein.

DETAILED DESCRIPTION OF THE PREFERRED EMBODIMENTS

Figure 1:
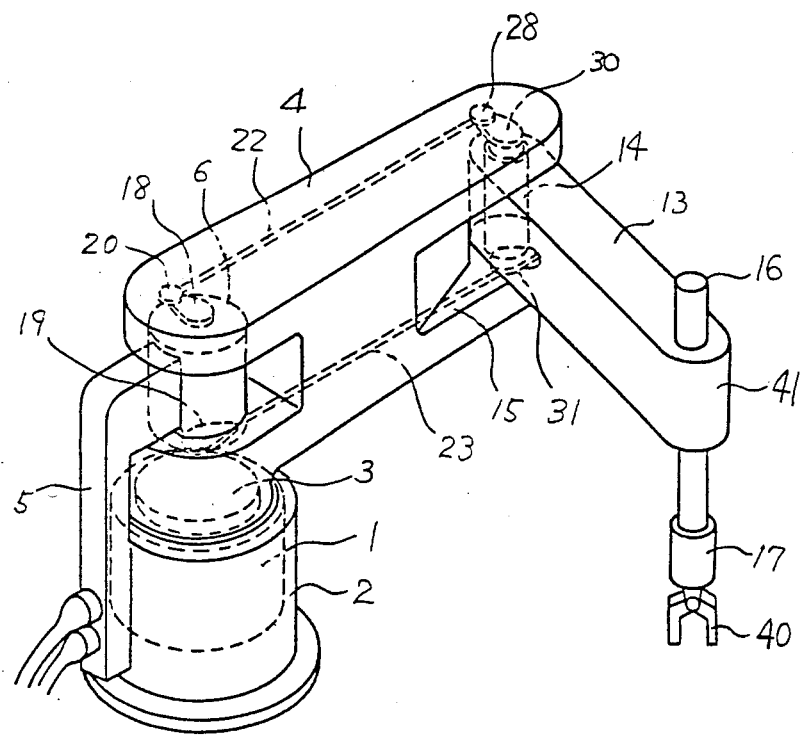
FIG. 1 is a perspective view of an embodiment of a robot of this invention.
Figure 2:
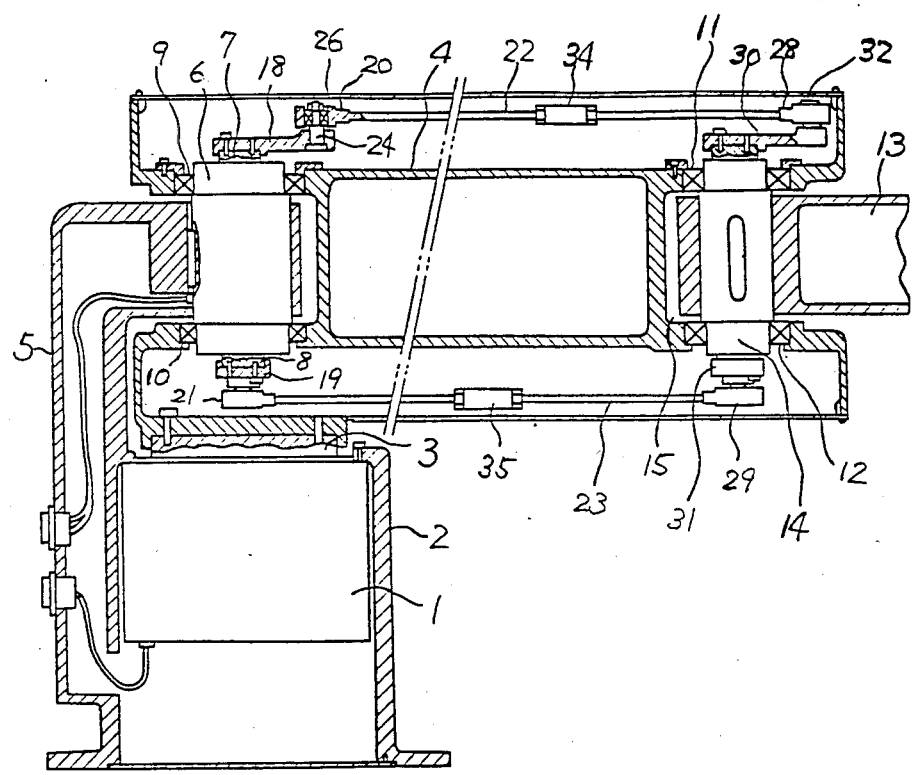
FIG. 2 is an elevational sectional view showing the major components of the embodiment shown in FIG. 1.

Referring to FIGS. 1 and 2, a first motor 1 of low speed and high torque which is fixed on a base 2 has a vertical pivotal first-motor shaft 3. A first arm 4 is fixed to the first-motor shaft 3. A supporting frame 5 is fixed to a side of the base 2, and a second motor 6 of low speed and high torque is supported by the supporting frame 5. The second motor 6 has two pivotal second-motor shafts 7 and 8, respectively, at its top and bottom, and the first-motor shaft 3 and the second-motor shafts 7 and 8 are arranged coaxially. A pair of first-arm bearings 9 and 10 are arranged on the first arm 4, and the first arm 4 and the second motor 6 are pivotably supported with the first-arm bearings 9 and 10.

Second-arm bearings 11 and 12 are arranged near the tip of the first arm 4, and the second arm 13 is pivotably supported by the second-arm bearing 11 and 12 with a second-arm shaft 14 which is fixed to the second arm 13. The first arm 4 has a cavity 15 around the second-arm shaft 14 such that the second arm 13 can pivot without interference with the first arm 4. The second-arm shaft 14 is arranged vertically, so that the second arm 13 pivots horizontally as does the first arm 4.

The second arm 13 has a vertically sliding axis 16 at a tip 41, and the vertically sliding axis 16 has a revolving axis 17. The revolving axis 17 has an endeffector 40 at its bottom end which manipulates objects, such as parts to be assembled (not shown).

A first lever 18 and a second lever 19 are respectively fixed to the second-motor shafts 7 and 8, and extend perpendicular to the shafts 7 and 8, at a right angle to each other. First and second connecting rods 22 and 23 include tips 20 and 21 which are pivotably connected to the first and the second levers 18 and 19 via shafts 24 and 25 (shown in FIG. 4) and bearings such as bearing 26 shown in conjunction with lever 18 in FIG. 2. The opposite tips 28 and 29 of the first and the second connecting rods 22 and 23 are likewise pivotably connected to a third lever 30 and a fourth lever 31, respectively, via shafts 32 and 33 (shown in FIG. 4) and bearings (not shown). The third lever 30 and the fourth lever 31 are fixed to the top and the bottom, respectively, of the second-arm shaft 14, and extend perpendicular to the second-arm shaft 14, at a right angle to each other. The connecting rods 22 and 23 have span adjusters 34 and 35 which are used to adjust the lengths of the connecting rods 22 and 23. This adjustment can make the first lever 18 and the third lever 30, and the second lever 19 and the fourth lever 31 parallel.

The motion of the robot is described below. When the first-motor shaft 3 pivots counter-clockwise, the first arm 4 also pivots counter-clockwise, as shown at 4-4a-4b in FIG. 3. At that time, the second-motor shafts 7 and 8, the first lever 18 and the second lever 19 do not move. Therefore, the orientation of the second arm 13 does not change, as shown at 13-13a-13b in FIG. 3, so that the part of the load on the first motor 1 resulting from the revolution of the second arm 13 is eliminated.

Figure 3:
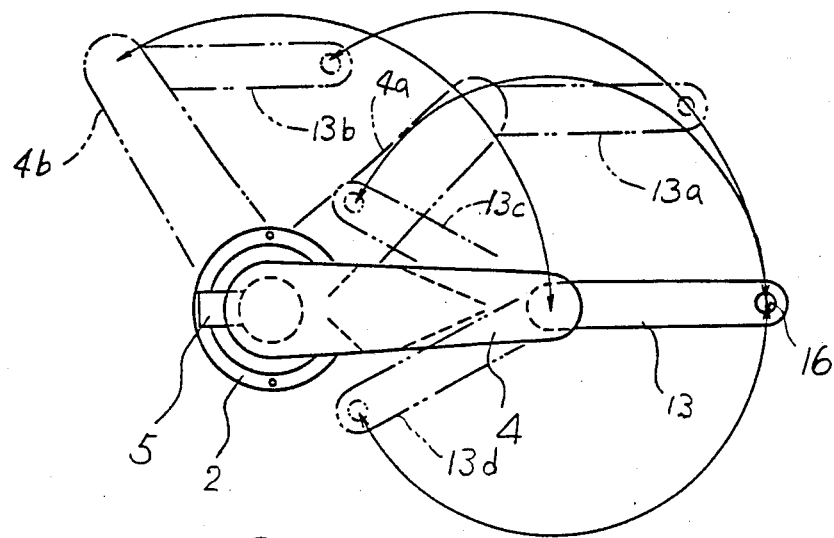
FIG. 3 is a plan view of the embodiment shown in FIG. 1 to display its motion.
Figure 4:
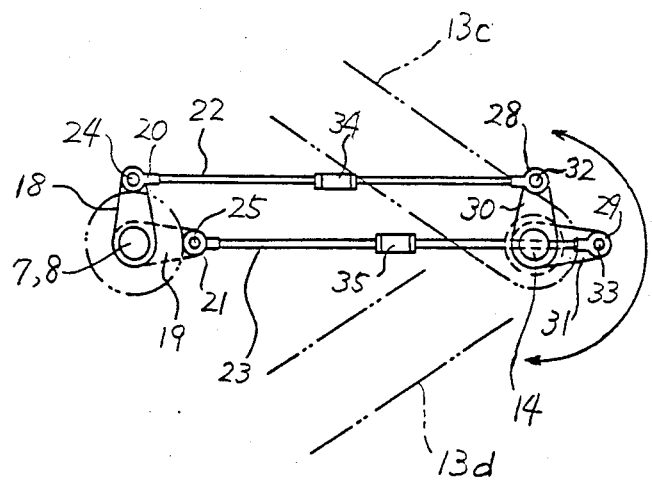
FIG. 4 is a partial plan view of the embodiment shown in FIG. 1 showing the motion of essential parts.

When the second-motor shafts 7 and 8 pivot, the second arm 13 pivots, as shown at 13c-13-13d in FIGS. 3 and 4, in accordance with the movement of the levers 18, 19, 30 and 31, and the connecting rods 22 and 23. Since the first and the second levers 18 and 19, and the third and the fourth levers 30 and 31 are arranged at right angles, there are no "dead points" where the second arm 13 is unstable in position, and the second arm 13 can be freely driven unless the first arm 4 interferes with the second arm 13 in the cavity 15.

Since the second motor 1 is supported by the supporting frame 5, which is fixed to the base 2, the reaction of the second motor 6 does not add loads on the first motor 1.

Since no gears for speed reduction are used, high-speed and high-precision motion of the second arm 13 can be obtained by using the levers 18, 19, 30 and 31, and connecting rods 22 and 23 of sufficient rigidity.

Since the two second-motor shafts 7 and 8 are arranged at both ends of the second motor 6, the stress in the second-motor shafts 7 and 8 is mitigated compared with the stress in the conventional one-sided crank shaft.

Figure 5:
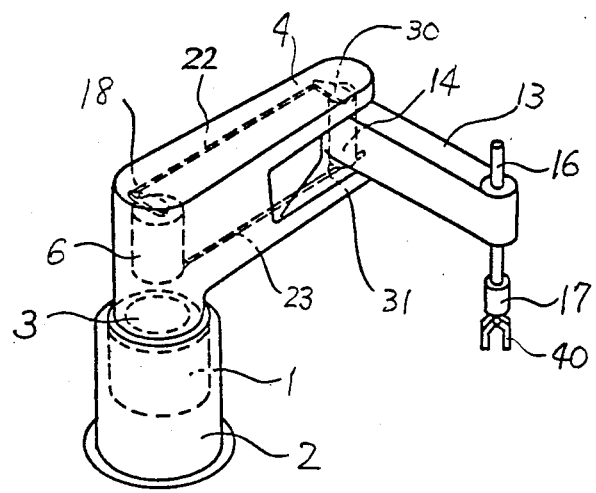
FIG. 5 is a perspective view of another embodiment of a robot of this invention.

As for another embodiment of the present invention, the second motor 6 can be supported on the first arm 4, instead of the base 2, as shown in FIG. 5. In this embodiment, stress in the second-motor shafts (not shown) is mitigated as in the above-described embodiment, although the load on the first motor 1 is not mitigated.

The foregoing description has been set forth merely to illustrate preferred embodiments of the invention and is not intended to be limiting. Since modifications of the described embodiments incorporating the spirit and substance of the invention may occur to persons skilled in the art, the scope of the invention should be limited solely with respect to the appended claims and equivalents.

I claim:
1. A multi-jointed robot, comprising:
a first arm;
first drive means connected to the first arm and having a central axis, for pivotally moving the first arm about the central axis;
a second arm, pivotally connected to the first arm for relative motion, therebetween; and
second drive means for moving the second arm with respect to the first arm, including a low-speed, high-torque motor and motor drive shaft means directly extending from opposite sides of the motor and being operatively connected to the second arm on the both sides of the motor for reducing stress on the motor, wherein the shaft means includes a rotatable shaft protruding from opposite sides of the motor, a pair of connecting rods, each connecting rod being directly connected to the shaft on an opposite side of the motor for transmitting the motion of the shaft to the second arm, and coupling means for jointing the shaft to the connecting rods.

2. A multi-jointed robot, comprising:
a first arm;
first drive means connected to the first arm and having a central axis, for pivotally moving the first arm about the central axis;
a second arm, pivotally connected to the first arm for relative motion therebetween; and
second drive means for moving the second arm with respect to the first arm, including a low-speed, high-torque motor and shaft means directly extending from opposite sides of the motor operatively connected to the second arm for reducing stress on the motor, wherein the shaft means includes a rotatable shaft protruding from the opposite sides of the motor, a pair of connecting rods for transmitting the motion of the shaft to the second arm, and coupling means for jointing the shaft to the connecting rods, wherein the coupling means includes a pair of levers, one lever fixed to each end of the shaft and extending substantially perpendicular to the shaft.

3. The robot of claim 2 also including a second-arm shaft fixed to the second arm for pivotally connecting the first and second arms, and a second pair of levers, one lever fixed to each end of the second-arm shaft and extending substantially perpendicular to the second-arm shaft.

4. The robot of claim 1 also including a base, the first drive means being fixed to the base.

5. The robot of claim 4 also including means for supporting the motor with the base for reducing the torque requirements of the first drive means.

6. The robot of claim 1 wherein the motor is attached to the first arm.

7. The robot of claim 2, further comprising a base, the first drive means being fixed to the base.

8. The robot of claim 7, further comprising means for supporting the motor on the base for reducing the torque requirements of the first drive means.

9. The robot of claim 2, wherein the motor is attached to the first arm.

* * * * *